UNITED STATES PATENT OFFICE.

ANTHONY PIRZ, OF LONG ISLAND CITY, ASSIGNOR, BY MESNE ASSIGNMENTS, TO REUBEN C. BARROWS, OF NEW YORK, N. Y.

IMPROVEMENT IN THE MANUFACTURE OF ACETIC ACID.

Specification forming part of Letters Patent No. 209,979, dated November 19, 1878; application filed August 22, 1878.

*To all whom it may concern:*

Be it known that I, ANTHONY PIRZ, of Long Island City, Queens county, in the State of New York, have invented certain new and useful Improvements relating to the Manufacture of Acetic Acid; and I do hereby declare that the following is a full and exact description thereof.

The acid is made from acetate of lime. The latter may be prepared from wood by the ordinary means. My process is cheaper than any equally efficient which was before known to me. Acetate of lime cannot be made to give up all its acetic acid by repeated leaching and pressing. I have operated very thoroughly by such method with this material, but with the greatest labor and care have only succeeded in extracting a part.

I have now discovered and practically worked out an improved method. I put the acetate of lime in a tank covered with a perforated screen, and slowly pour thereon through such screen diluted sulphuric acid, causing it to be evenly distributed upon the mass. I commence with the sulphuric acid of a strength of 60° Baumé, but as the work proceeds gradually increase the proportion of water. I provide a faucet as nearly flush with the bottom of the tank as possible, on opening which the acetic acid is removed.

There may be, and preferably is, a considerable quantity of acetic acid in the water with which the sulphuric is diluted at the commencement. The weak acetic acid which is obtained toward the close of the operation is reserved to be used in diluting the sulphuric acid for the commencement of the treatment of the next lot of fresh acetate. Only the strong acid which is extracted at the commencement of the operation is sold for use.

My acid is easily freed from tarry and other foreign matters, and produces an acetic acid of superior purity and at little cost.

Care should be taken to avoid all agitation during the leaching process. It is desired that the dilute acid shall percolate through the acetate of lime in as undisturbed a condition as possible.

I claim as my invention—

The process of extracting acetic acid from acetate of lime by leaching with sulphuric acid in gradually-weakened solutions, and using the weak acetic acid as a diluter for the sulphuric for subsequent operation, as herein specified.

In testimony whereof I have hereunto set my hand this 20th day of August, 1878, in the presence of two subscribing witnesses.

ANTHONY PIRZ.

Witnesses:
J. FRED. FRANKLIN,
GEORG HORN.